Nov. 12, 1946. J. R. WOOD 2,411,123
GRIPPER MECHANISM
Filed Jan. 24, 1945 3 Sheets-Sheet 1
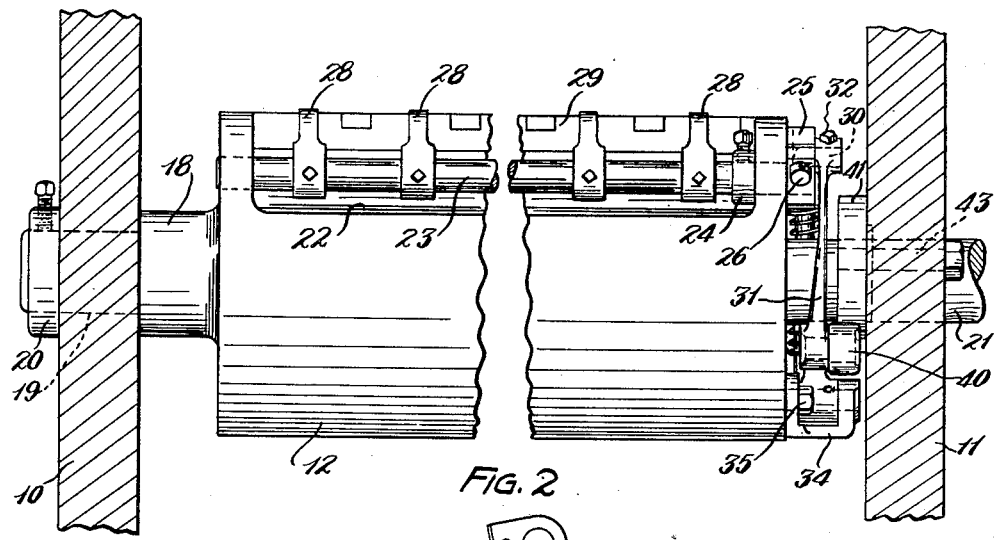
INVENTOR
JAMES R. WOOD
BY
Kwis Hudson Boughton & Williams
ATTORNEYS Nov. 12, 1946.     J. R. WOOD     2,411,123
GRIPPER MECHANISM
Filed Jan. 24, 1945          3 Sheets-Sheet 3

INVENTOR.
JAMES R. WOOD
BY Kwis Hudson Boughton & Williams
ATTORNEYS

Patented Nov. 12, 1946

2,411,123

UNITED STATES PATENT OFFICE 2,411,123

GRIPPER MECHANISM

James R. Wood, Cleveland, Ohio, assignor to Harris-Seybold Company, a corporation of Delaware Application January 24, 1945, Serial No. 574,279

15 Claims. (Cl. 101—408)

This invention relates to improvements in gripper mechanism, that is to say mechanism for shifting sheet grippers from operative to inoperative position and vice versa. As illustrated herein it is applied to a sheet handling cylinder, and it finds its principal utility in that connection. In certain of its aspects, however, it is applicable to gripper mechanism for endless conveyers.

The present application is a continuation-in-part of my copending application Serial No. 448,208 filed June 24, 1942.

One of the objects of the invention is the provision of spring loaded gripper mechanism of such character that the leverage through which the spring acts shall vary and shall be at a maximum when the grippers are in sheet gripping position, thereby permitting the use of a relatively weak spring and consequently reducing the stresses imposed upon the mechanism.

Another object is the provision of a gripper mechanism wherein the tendency of the grippers to rebound is reduced.

A further object is the provision of gripper mechanism of simple construction, capable of high speed operation, with reduced wear upon the operating parts.

Another object is the provision of a gripper mechanism wherein the grippers may be either breathed or tumbled, or both operations performed in succession if desired.

Other objects and features of novelty will appear as I proceed with the description of that embodiment of the invention which, for the purposes of the present application, I have illustrated in the accompanying drawings, in which Fig. 1 is an end view, partly in section, showing my improved mechanism applied to the impression cylinder of a printing press and in sheet gripping position, certain other portions of the machine being shown diagrammatically.

Fig. 2 is a side view of the same looking in the direction of arrows 2—2 of Fig. 1.

Fig. 3 is a view similar to Fig. 1 showing the grippers tumbled into inoperative or receded position.

Figure 4:
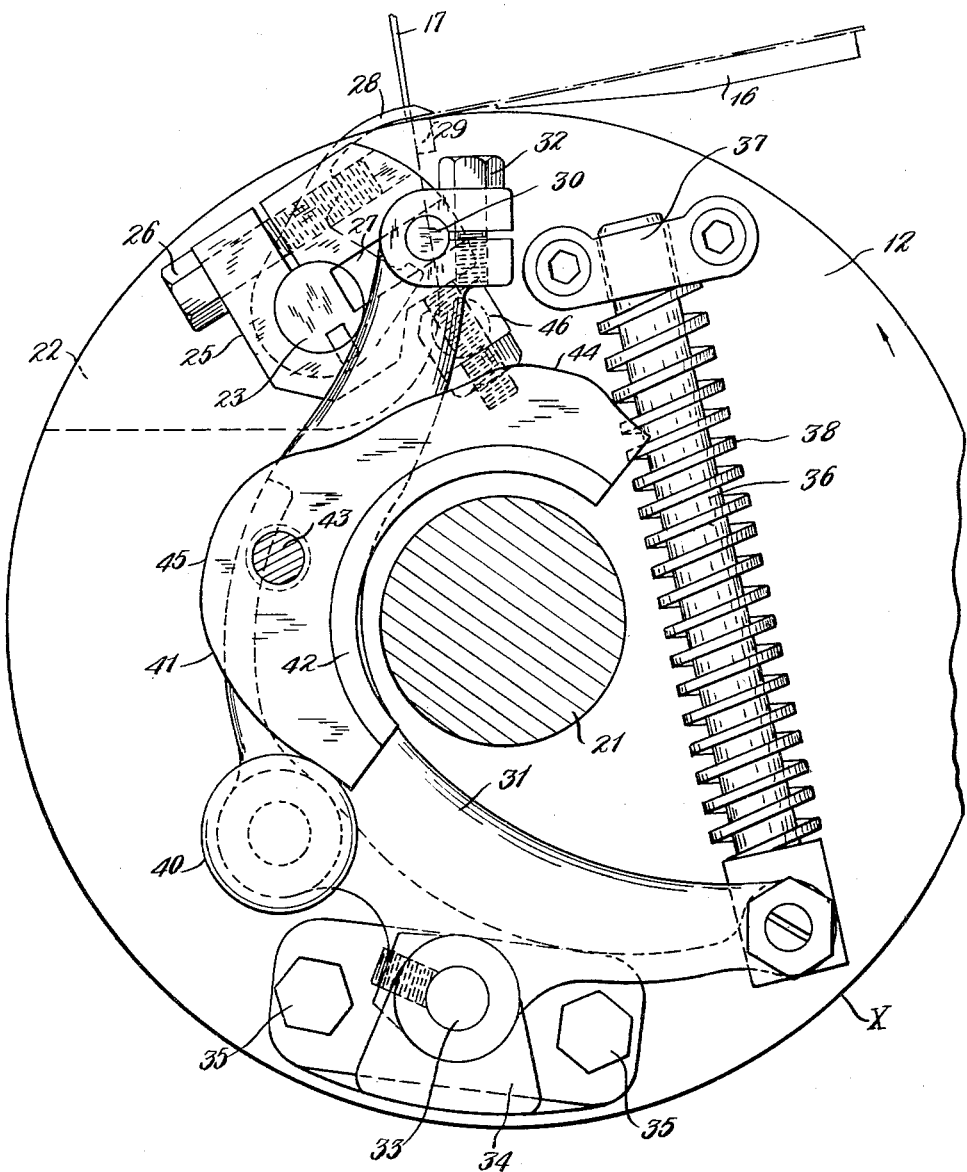
Fig. 4 is a view on an enlarged scale corresponding to a portion of Fig. 1.

In the preferred form of the invention illustrated in Figs. 1 to 4 inclusive, two frame members of a printing press are indicated at 10 and 11. Between these frame members there is mounted a cylinder 12 which may be an impression cylinder of an offset or other press, this cylinder being shown in Fig. 1 in operative relation with a blanket cylinder 13 and with an endless chain sheet delivery member 14 running over a sprocket 15. A feed board is shown at 16 over which sheets may be fed into position against front stops 17 by means of which the sheets are front registered before being taken by the gripper mechanism. It should be understood, however, that the gripper mechanism of the present invention may be applied to any sheet handling cylinder, and that in fact it is applicable in some of its aspects to sheet transporting members other than cylinders.

At one end of cylinder 12 there is an integral shaft member 18 with a reduced extension 19 rotatably mounted in a bearing in the frame member 10 and provided outside the frame with a collar 20 fixed to the shaft whereby axial movement of the cylinder is prevented. At the opposite end of the cylinder there is another shaft portion 21 rotatably mounted in frame member 11.

Cylinder 12 is provided with a recess or gap 22 through which extends a gripper shaft 23 which is oscillatably mounted in the cylinder at the ends of this gap. Longitudinal movement of shaft 23 is prevented by a collar 24 fixed to the shaft and a split crank arm 25 that is keyed to the shaft and fastened thereto by a machine screw 26. Crank arm 25 has formed therein a cam slot 27 which in this form of the invention is a straight slot radially positioned. In the illustrated case the slot extends for a short distance into the shaft 23. Gripper fingers 28 of any suitable conventional form and herein shown as one-piece members are distributed at intervals along the length of the shaft 23 to which they are adjustably secured by set screws. These fingers are adapted to bear against the gripper pads 29 in the usual manner.

The grippers of this invention are tumbler grippers, but instead of being thrown from operative to inoperative position and vice versa by pins fixed in the frame of the machine as is customary, I employ a single pin 30 which is carried by the cylinder 12 and remains constantly in the slot 27. Pin 30 is held in the grasp of a split end of a lever 31, being fastened in position by a machine screw 32. Lever 31, which is curved to clear shaft section 21, is pivotally mounted at 33 in a bracket 34 that is secured to the end of the cylinder by screws 35 or the like. The opposite end of the lever which extends beyond the pivot 33 is pivotally connected with a rod 36 which runs through a yoke 37 bolted to the end of the cylinder. A compression spring 38 surrounding rod 36 bears at one end against a shoulder on rod 36 and at the other end against the yoke 37, thereby tending to swing the lever in a clockwise direction about its pivot 33.

Lever 31 carries roller 40 which is adapted to engage the periphery of a fixed cam 41. This cam rests against the inner surface of frame member 11 and is provided with a rib 42 formed along the arc of a circle, which rib fits within a circular groove in the face of the frame member 11. Its angular position is determined and fixed by a post 43 which extends through a smooth hole in the frame member and is threaded into a tapped hole in the cam. This cam has a hump 44 and a high spot 45. An adjustable stop 46 of conventional form is mounted on the end of the cylinder 12 in position to be engaged by the crank arm 25 at one limit of its motion, as indicated in Fig. 4.

When the roller 40 is on the high spot 45 of the cam, as in Fig. 3, the lever 31 is swung anticlockwise against the action of spring 38, and the gripper fingers 28 are tumbled into the recess or gap 22 of the cylinder. This is the position of the parts as the grippers pass the forward end of feed board 16. Immediately afterward the roller 40 descends from the high spot of the cam and the spring 38 swings the lever 31 clockwise around its pivot 33. The pin 30 then moves through a relatively long arc to the opposite side of the shaft 23, and in doing so it travels inwardly and then outwardly along the slot 27, imparting movement to the crank arm 25 which is gradual at first, quite rapid at the midpoint of the pin travel and gradually slower as the grippers approach gripping position, shown in Figs. 1 and 4.

It will be observed that in the latter position the slot 27 is approaching a position at right angles to a line between the pivot 33 and the shaft 23, and since the pin 30 at that time occupies a position near the outer end of the slot the movement of the pin at that point exerts a strong wedging or camming action on the crank arm. In other words the parts are then so related that there results a mechanical advantage favoring the application of gripping force to the sheet being taken from the feed board. The extent of this mechanical advantage may be varied to some degree by a change in the angular position of the radial slot, by causing the slot to depart more or less from a radial position or by making the slot curved rather than straight.

The sheet after being gripped as illustrated in Figs. 1 and 4, is carried around the cylinder 12 for a predetermined distance which depends upon the specific nature of the machine. In the present instance the sheet remains in the grip of the fingers 28 until they reach substantially the position marked X in Fig. 4, at which time the roller 40 will travel up onto the hump 44 of the cam. This hump is not high enough to tumble the grippers. It merely rocks the shaft 23 through a slight angle sufficient to release the sheet so that it may be taken by grippers 50 on the endless conveyor 14. The spring 38 then returns the grippers 28 momentarily to engagement with the pads 29, after which the roller 40 engages the high spot 45 of the cam when the grippers are again tumbled into the position of Fig. 3.

Variations from the above described structure may be employed. For example, instead of a slot in the crank arm 25, I may provide merely a cam surface on that arm corresponding to one side of the slot, with which surface the pin 30 cooperates when the grippers are swung to sheet gripping position, the movement of the shaft in the opposite direction for tumbling the grippers into the gap 22 being effected by spring means, not shown, tending to rotate the shaft 23 in the counterclockwise direction, as viewed in Figs. 1 and 4. Such a spring would carry a light burden only as it would merely have to cause the cam surface to follow the pin 30 in its travel from the position of Fig. 1 to that of Fig. 3. However the arrangement preferably is such in any case that equal increments of movement of the lever will produce progressively decreasing increments of movement of the crank arm, and consequently increasing mechanical advantage, as the grippers approach closing position.

One of the important results of this increasing mechanical advantage is a diminution of the tendency of the grippers to rebound after striking their pads 29.

The spring 38 in urging the gripper finger 28 toward sheet gripping position, becomes extended and consequently decreases in power at that time. The pin and slot arrangement described above compensates for this decrease in spring power, for as the pin moves outwardly in the slot the mechanical advantage of the spring actuated lever 31 increases. The effect of the spring may therefore be maintained uniform or even increased as the grippers close on the sheet.

Figure 5:
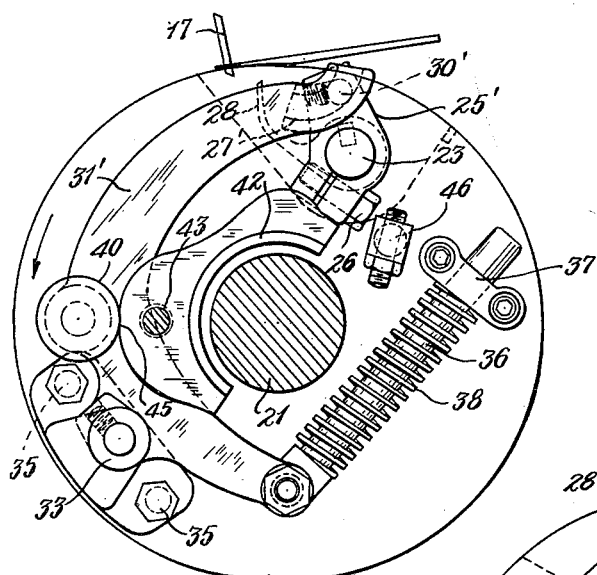
Fig. 5 is a view similar to Fig. 4 but showing a modified form of the invention with the grippers in withdrawn position.
Figure 6:
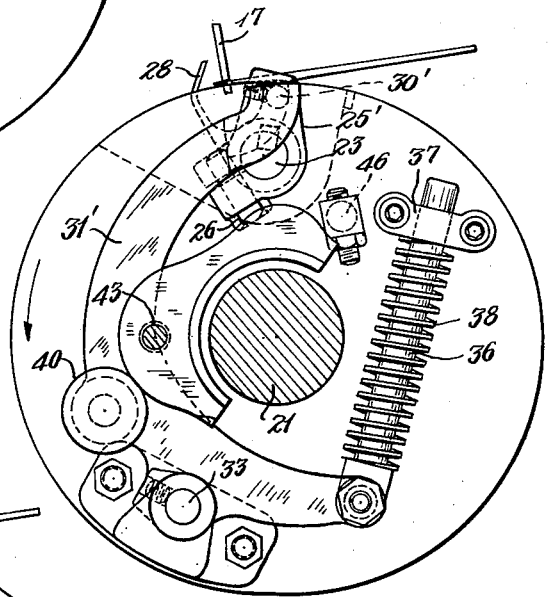
Figs. 6 and 7 are views similar to Fig. 5 with grippers in intermediate and closed positions respectively.
Figure 7:
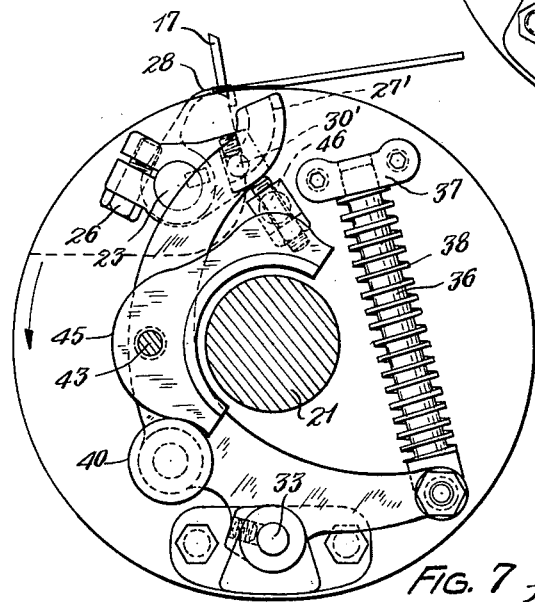

In the form of the invention illustrated in Figs. 5, 6 and 7, the pin and slot connection is reversed, that is to say the pin 30' is mounted in the crank arm 25' and the slot 27' is formed in the lever 31'. Insofar as this invention is concerned a groove is equivalent to a slot, and the term "slot" is used herein as including both.

In the illustrated case the slot 27' is curved, and an intermediate point thereof is tangent to a straight line from the axis of shaft 33. When the gripper fingers 28 are tumbled into the gap of the cylinder, as they are in Fig. 5, the pin 30' contacts the slot 27' at an intermediate point of its length. As the lever arm 31' moves from this position toward the gripper closing position it passes through the intermediate stage illustrated in Fig. 6, where the pin 30' lies substantially at the outer end of the slot 27'. From the position of Fig. 6 the movement of lever arm 31' and the action of spring 38 cause the pin 30' to travel inwardly along the slot 27' thus producing at first relatively rapid angular movement of the crank arm 25' and then as the direction of the effective portion of the slot approaches the line of centers of the pin and shaft 23 corresponding to gripper closing position, the rate of movement of the crank arm decreases relative to the rate of movement of the lever arm. The leverage therefore increases. Consequently the gripper fingers are caused to close at a moderate speed, thereby avoiding rebound, and to close firmly. As in the first described form of the invention a spring 38 of moderate strength may be used because of the high leverage at the time the gripper fingers close.

In both of the illustrated forms of the invention, at the time the grippers close, the direction of the effective portion of the slot 27 or 27', as the case may be, is toward the shaft 23 at an angle to the line of centers of pin 30 or 30' and pivot 33. Preferably, and as illustrated, this angle is greater than 45°. Consequently, at the time of gripper closing the direction of travel of the point of contact between the pin and slot is at an angle greater than 45° to the direction of application of the driving force applied by the operating lever 31 to the crank 25. At 45° a given linear motion of the lever at the pin and slot connection results in a substantially equivalent linear motion of the crank at the said point, but as the angle in question is increased above 45° the amount of movement of the lever necessary to produce a given movement of the crank increases, which is a desirable result because it provides a mechanical advantage and reduces rebound of the grippers.

The breathing of the grippers at the point of transfer from cylinder 12, rather than tumbling them into the cylinder gap at that point, is important. After breathing, they again come immediately into sheet gripping position, where they remain from a point in the vicinity of point X of Fig. 4 until they approach the position of Fig. 3 or Fig. 5, as the case may be. Any adjustment of the individual grippers must be performed while they are in sheet gripping position. That part of the cylinder which is conveniently accessible to the workman while the machine is idle is the part beneath the feed board, in other words between the point X and the place where the grippers are tumbled into the cylinder. The present invention maintains the grippers closed in this accessible angle of the cylinder. Without the low part of cam 41 following the hump 44, the adjustment of the grippers would have to be accomplished while they were in an inaccessible portion of their travel.

The type of mechanism herein disclosed is important also in cases where the grippers are caused to breathe only, whether in cylinders or endless conveyers, as many of the advantageous features of the invention are realized in constructions of that character.

Having thus described my invention, I claim:

1. Gripper mechanism for a sheet carrying member, comprising a gripper shaft arranged to rock in bearings carried by said member, a crank arm for the shaft, an operating lever pivotally mounted on said member, a pin and slot connection between said lever and said crank arm, the slot of said connection where contacted by the pin just prior to and at the time the grippers are in sheet gripping position extending in a line directed toward said shaft, and the angle between said line and the line of centers of the pin and lever pivot being greater than forty-five degrees.

2. Gripper mechanism for a sheet carrying member, comprising a gripper shaft arranged to rock in bearings carried by said member, a crank arm for the shaft, an operating lever pivotally mounted on said member, a pin and slot connection between said lever and said crank arm, said slot extending in a substantially radial direction outwardly from the pivot point of the element in which it is formed, spring means biasing the lever toward gripper closing position, and cam means for moving the lever in the opposite direction against the action of said spring means, the pin of the pin and slot connection moving outwardly in the slot and the slot lying at an angle to the line between the pin and lever pivot as the grippers approach sheet gripping position.

3. Gripper mechanism for a sheet handling cylinder, comprising a gripper shaft arranged to rock in bearings carried by the cylinder, means for rocking said shaft comprising a crank arm member on the shaft and a lever member pivotally mounted on the cylinder, an operative connection between said lever member and crank arm member comprising a cam surface on one member and a cooperating pin on the other member, said cam surface extending in a substantially radial direction outwardly from the pivot point of the element in which it is formed, the point of contact between said pin and said cam moving outwardly along the cam, and the cam lying at an angle to the line between the pin and lever pivot as the grippers approach sheet gripping position, spring means biasing the lever member for movement toward gripper closing position, and cam means for moving it in the opposite direction.

4. Gripper mechanism for a sheet carrying member, comprising a gripper shaft arranged to rock in bearings carried by said member, a crank arm for the shaft, an operating lever pivotally mounted on said member, a pin in said crank arm and a cooperating slot in said lever, said slot where contacted by said pin just prior to and at the time the grippers are in sheet gripping position extending in a direction toward said shaft and at an angle to the line of centers of the pin and lever pivot, whereby mechanical advantage for applying force to the crank arm is attained.

5. Gripper mechanism for a sheet carrying member, comprising a gripper shaft arranged to rock in bearings carried by said member, a crank arm for said shaft, an operating lever pivotally mounted on the said member, a pin and slot connection between said lever and said crank arm, the point of contact between said pin and slot moving outwardly with respect to the pivot of the slotted element, and the slot lying at an angle to the line between the pin and lever pivot as the grippers approach closing position, and means for swinging the lever toward and away from gripper closing position.

6. Gripper mechanism for a sheet carrying member, comprising a gripper shaft arranged to rock in bearings carried by said member, a crank arm for said shaft having a cam slot therein extending outwardly from said shaft, an operating lever pivotally mounted on said member having a pin running in said slot, and means for swinging the lever to cause said pin to move outwardly in the slot as the grippers approach sheet gripping position.

7. Gripper mechanism for a sheet handling cylinder, comprising a gripper shaft arranged to rock in bearings carried by the cylinder, a crank arm for the shaft, an operating lever pivotally mounted on the cylinder, spring means biasing the lever for movement toward gripper closing position, cam means for moving it in the opposite direction, and means for communicating movement from said lever to said crank arm for swinging the grippers to sheet gripping position, comprising a pin on the lever and a cooperating cam surface on the crank arm extending outwardly from said shaft, said pin travelling outwardly over said cam surface as the grippers approach closing position.

8. Gripper mechanism for a sheet carrying member, comprising a gripper shaft arranged to rock in bearings carried by the said member, a crank arm for said shaft having a cam slot therein extending outwardly from said shaft, an operating lever pivotally mounted on the said member having a pin running outwardly in said slot as the grippers approach closing position, spring means biasing the lever toward gripper closing position, and cam means responsive to the travel of said member for moving the lever in the opposite direction crosswise of the gripper shaft against the action of said spring means.

9. Gripper mechanism for a sheet handling cylinder, comprising a gripper shaft arranged to rock in bearings carried by the cylinder, a crank arm for said shaft having a cam slot therein, an operating lever pivotally mounted on the cylinder having a pin running in said slot, spring means biasing the lever toward gripper closing position, and cam means responsive to rotation of the cylinder for moving the lever against the action of said spring far enough to relieve the sheet gripping action and thereafter by a separate action for tumbling the grippers.

10. Gripper mechanism for a sheet carrying member, comprising a gripper shaft arranged to rock in bearings carried by the said member, a crank arm for said shaft having a cam slot therein extending outwardly from said shaft, an operating lever pivotally mounted on the said member having a pin running in said slot, spring means biasing the lever toward gripper closing position, and cam means responsive to the travel of said member for moving the lever in the opposite direction against the action of said spring means said slot being so arranged that the pin travels outwardly in the slot as the grippers approach closed position.

11. Gripper mechanism for a sheet carrying member, comprising a gripper shaft arranged to rock in bearings carried by the said member, a crank arm for said shaft having a cam slot therein extending outwardly from said shaft, an operating lever pivotally mounted on the said member having a pin running in said slot, spring means biasing the lever toward gripper closing position, and cam means responsive to the travel of said member for moving the lever in the opposite direction against the action of said spring means said slot being so arranged that as the gripper shaft rocks from gripper closing position to gripper opening position or vice versa the pin travels inwardly toward the axis of the gripper shaft and then outwardly away from the said axis.

12. Gripper mechanism for a sheet handling cylinder, comprising a gripper shaft arranged to rock in bearings carried by the cylinder, a crank arm for said shaft, a lever pivotally mounted on the cylinder operatively connected with said crank arm, spring means tending to hold said gripper shaft in gripper closing position, and means responsive to rotation of the cylinder for shifting said lever first to relieve the sheet gripping action and thereafter by a separate action to rock said gripper shaft sufficiently to tumble the grippers away from sheet gripping position.

13. Gripper mechanism for a sheet carrying member, comprising a gripper shaft arranged to rock in bearings carried by said member, a crank arm for said shaft, an operating lever pivotally mounted on said member, a pin in said crank arm, said operating lever having a slot therein within which said pin runs, said slot being curved and so disposed in the lever that at its point of contact with the pin when the grippers approach closed position it is directed substantially toward said shaft.

14. Gripper mechanism for a sheet carrying member, comprising a gripper shaft arranged to rock in bearings carried by said member, a crank arm for said shaft, an operating lever pivotally mounted on said member, a pin in said crank arm, said operating lever having a slot therein within which said pin runs, said slot being curved and so disposed that an intermediate point is tangent to a straight line from the pivot point of said operating lever, and the inner end of the slot is directed substantially toward said shaft when the grippers are in closed position.

15. Gripper mechanism for a sheet carrying member, comprising a gripper shaft arranged to rock in bearings carried by said member, a crank arm for the shaft, an operating lever pivotally mounted on said member, a pin and slot connection between said lever and said crank arm, the slot of said connection where contacted by the pin just prior to and at the time the grippers are in sheet gripping position extending in a line directed toward said shaft, and at an angle to the line of centers of the pin and lever pivot.

JAMES R. WOOD.